United States Patent [19]

Thomas

[11] 4,080,847
[45] Mar. 28, 1978

[54] SPEED RESPONSIVE PLANETARY TRANSMISSION

[76] Inventor: William Morgan Thomas, 2517 Denmark, Garland, Tex. 75040

[21] Appl. No.: 692,311

[22] Filed: Jun. 3, 1976

[51] Int. Cl.² .................... F16H 3/74; F16H 37/06
[52] U.S. Cl. .................................. 74/751; 74/682
[58] Field of Search .............................. 74/751, 682

[56] References Cited

U.S. PATENT DOCUMENTS

| | | | |
|---|---|---|---|
| 2,292,079 | 8/1942 | Joyce | 74/751 |
| 2,320,854 | 6/1943 | Dethridge | 74/751 |
| 2,480,032 | 8/1949 | Kochis | 74/682 |
| 3,439,561 | 4/1969 | Preston | 74/751 |
| 3,899,941 | 8/1975 | Cook | 74/751 X |
| 4,041,835 | 8/1977 | Isler | 74/751 |

OTHER PUBLICATIONS

"Gear Engineering," H. E. Merritt, Pitman Publishing Corp., 1971, pp. 180–199.

*Primary Examiner*—Samuel Scott
*Assistant Examiner*—Lance W. Chandler
*Attorney, Agent, or Firm*—Joseph H. Schley; Thomas L. Cantrell

[57] ABSTRACT

Disclosed is an automatically variable transmission of the planetary type in which the planet gears of the main or power gear train are carried on a rotatable power cage but are not bounded by an internally toothed ring gear. The transmitted torque and speed (relative to input speed) are functions of the rate of rotation of the power cage. Power cage rotation is controlled by driving it through a second or control planetary gear train having a similar rotatable control cage, the source of power being the input shaft of the transmission. The speed ratio of the main gear train decreases from input to output, while that of the control gear train increases. In operation, the rotational speeds of the power cage and the control cage adjust automatically upon variations in load to values appropriate for delivery of the amount of torque required at the required speed.

10 Claims, 6 Drawing Figures

SPEED RESPONSIVE PLANETARY TRANSMISSION

BACKGROUND OF THE INVENTION a. Field of Use

Many power sources, and particularly internal combustion engines, have speed-torque curves which do not match the speed-load curve of the driven equipment well, and, in any event, the speed-load curve of a given piece of equipment can, and often does, vary widely with operating conditions. A prime example of this situation is the internal combustion engine powered automobile, although it also occurs in many other cases.

Two general solutions to the problem of obtaining a tolerable match between power plant performance characteristics and operating load requirements have become widely adopted from among many proposed solutions. The first of these is a clutch and manually operated gearbox offering a choice of two or more gear ratios appropriate for use at different speeds and loads. Disadvantages of such transmissions include the level of skill and coordination required to operate them, the limited number of well matched steps available, and the severe wear involved in changing from one gear to another.

The other general solution which has been widely adopted is that of the so-called "automatic" transmission involving a fluid filled turbine clutch drive, usually with "torque converter" features to reduce slippage at start-up, coupled to a multiple ratio gearbox provided with speed-torque responsive equipment for automatically shifting from one gear ratio to another at appropriate times. (Such gearboxes often include planetary gear trains). Disadvantages of such transmissions include the complexity and consequent expense of the equipment, liability to leakage in the hydraulic portion of the system, and the necessity for sensitive adjustments in the shifting control apparatus.

In accordance with the present invention, a simple all gear-and-shaft automatic transmission is provided in which the speed-torque characteristics of the power source are automatically and efficiently matched to the speed-torque requirements of the load. The transmission of the invention may replace conventional transmissions in automotive and other applications where speed-torque matching between power source and load is inherently poor over significant operating ranges.

b. Certain Prior Art

Planetary gear transmissions fall into two broad classes. In both, the planetary gears are arranged to mesh with, and revolve about, a central sun gear, and are carried in their revolution on a rotatable plate or similar structure called a carrier or cage. In one type, the planetary gears are bounded by an internally toothed ring gear, while in the other type they are not. It should be noted that in the second type, it is known that the torque transmission through the gear train is a function of the rate of rotation of the rotatable cage.

Prior workers have proposed to exploit this knowledge in various ways to produce automatic transmissions and speed-change devices. Some use a cone pulley driven by the power source to drive the cage at varying speeds. See U.S. Pat. Nos. 729,601; 2,164,818. Others selectively engage the cage to the prime mover through various forms of clutches to control cage rotation. See U.S. Pat. Nos. 1,299,629; 1,804,037; 2,504,306; 2,884,812. Still others employ brakes of various sorts for controlling the speed of cage rotation. See U.S. Pat. Nos. 918,632; 1,153,261; 1,869,543; 2,409,551;, 2806,389; 2,901,925; 2,941,421; 3,448,828. A variety of other employments of planetary gear transmission systems have been suggested. See U.S. Pat. Nos. 1,765,948; 2,455,407; 2,459,969; 2,705,429; 2,794,350; 3,442,157; 3,481,221; 3,501,980; 3,511,113; 3,675,509; 3,842,685.

SUMMARY OF THE INVENTION

The general failure of the many proposed planetary type transmissions discussed above to significantly displace the clutch-and-gearbox or fluid-drive planetary "automatic" transmissions despite their disadvantages is an indication that the variations of planetary transmissions proposed thus far themselves have disadvantages as torque-speed matchers.

In accordance with the present invention an automatic transmission of the planetary type is provided in which the main or power gear train has planetary gears meshed with sun gears but unbounded by an internally toothed ring gear. The planetary gears are carried on a rotatable cage. The main gear train has a decreasing overall speed ratio from input to output.

It is inherent in such a gear train that reactive forces will be transmitted through the gears and that these forces will tend to rotate the rotatable power cage. In the absence of any other force applying means acting to control the rotation of the power cage, the application of a torque load to the output shaft of such a gear train will cause the power cage to rotate backward at an ever increasing rate without increasing torque delivery to the output shaft until backward power cage rotation reaches a maximum.

As was pointed out above, prior art workers have proposed to supply control forces to the power cage to externally influence its rate of rotation and hence its torque delivery to the output shaft. The force applying means have typically been brake mechanisms or clutches connecting the cage to the input shaft.

In accordance with the present invention, a control gear train of the unbounded planetary type is provided for controlling rotation of the power cage in the main or power gear train. The input of the control gear train is a sun gear on the power input shaft while the output is a sun gear which is connected to the power cage of the main gear train. The sun gears are interconnected by planet gears carried on a control cage. The control gear trains has an increasing overall speed ratio from its input to is output.

As was the case with the main gear train, it is inherent that reactive forces in the control gear train will tend to rotate the control cage. Because of the increasing speed ratio of the control gear train, application of a torque load to its output — i.e. to the power cage — will tend to rotate the control cage forward at an ever increasing speed with an ever increasing torque transmission to the power cage until a maximum torque transmission is reached at a maximum control cage rotational speed.

In as much as the output of the control gear train is connected to the power cage of the main or power gear train in accordance with the invention, there is an interaction between the two reactive effects just separately described which results in an automatic balancing of internal torque loads in the transmission to produce an output torque appropriate to the output load.

Thus, when the output torque requirement is low, the control gear train rotates the power cage in a forward direction with a resulting speed transmission ratio approaching or exceeding one-to-one. With a moderate increase in output torque requirement, the speed of forward rotation of the power cage will slow — i.e. it will try to rotate backward. As the power cage slows its torque delivery increases, to the point where it actually stops and starts to turn backward, and torque delivery rises still further. The increase in torque delivery through the power cage is a change in the direction needed to meet the torque output requirement.

At the same time that the power cage slows, it applies a reactive torque load to the control cage, causing it to speed up and increase its torque output. Such an increase is a change in the direction needed to successfully counter the torque changes that cause the power cage to stop and turn backward.

After a very short interval the directions of rotation and speeds of rotation of the two cages stabilize at levels appropriate for the new torque load.

Upon application of a large increase in torque output requirement, as occurs for example at the start-up of a vehicle from standstill, the power cage may actually rotate backward with a high torque delivery for a short time until the rapidly rotating control cage can bring a halt to such backward rotation with an accompanying increase in rotational delivery. As vehicle speed is gathered, the power cage eventually rotates in a forward direction with a decreasing torque delivery which matches the load requirement.

In accordance with the invention, the basic automatic transmission just described may be modified to selectively lock-out the interplay between the two cages. Three modes of lock-out are feasible: (a) the power cage can be braked, mechanically or otherwise, against rotation; (b) the control cage can be braked against rotation; and (c) the power cage and control cage can be locked together, or either can be locked to the input shaft.

Under lock-out mode (a) the main gear train acts as a straightforward speed change gearbox, and the control cage rotates at a speed such that it has zero output rotation. In an automotive application, mode (a) provides a selectable controlled low gear.

In lock-out mode (b), the power cage speeds up to a relative speed equal to the power cage ratio, thus producing an "overdrive" effect. However, this mode is very demanding on the gearing, which must be carefully designed to withstand the severe operating conditions.

Under lock-out mode (c) the transmission becomes a straight-through power transmission device, such as is desirable for high ger highway cruising on level or moderate grades in an automobile.

One, some, or all of the lock-out modes just described may be provided in a single transmission.

From the foregoing, it can be seen that the principal object of the present invention is the provision of an improved mechanical automatically variable transmission of the planetary type. It is a further object of the invention to provide such a transmission which is selectably lockable into one or more fixed modes.

The manner in which these objects and purposes, together with other objects and purposes, are achieved, can be best understood from the detailed description which follows, together with the accompanying drawings.

DESCRIPTION OF THE PREFERRED EMBODIMENTS

Figure 1:
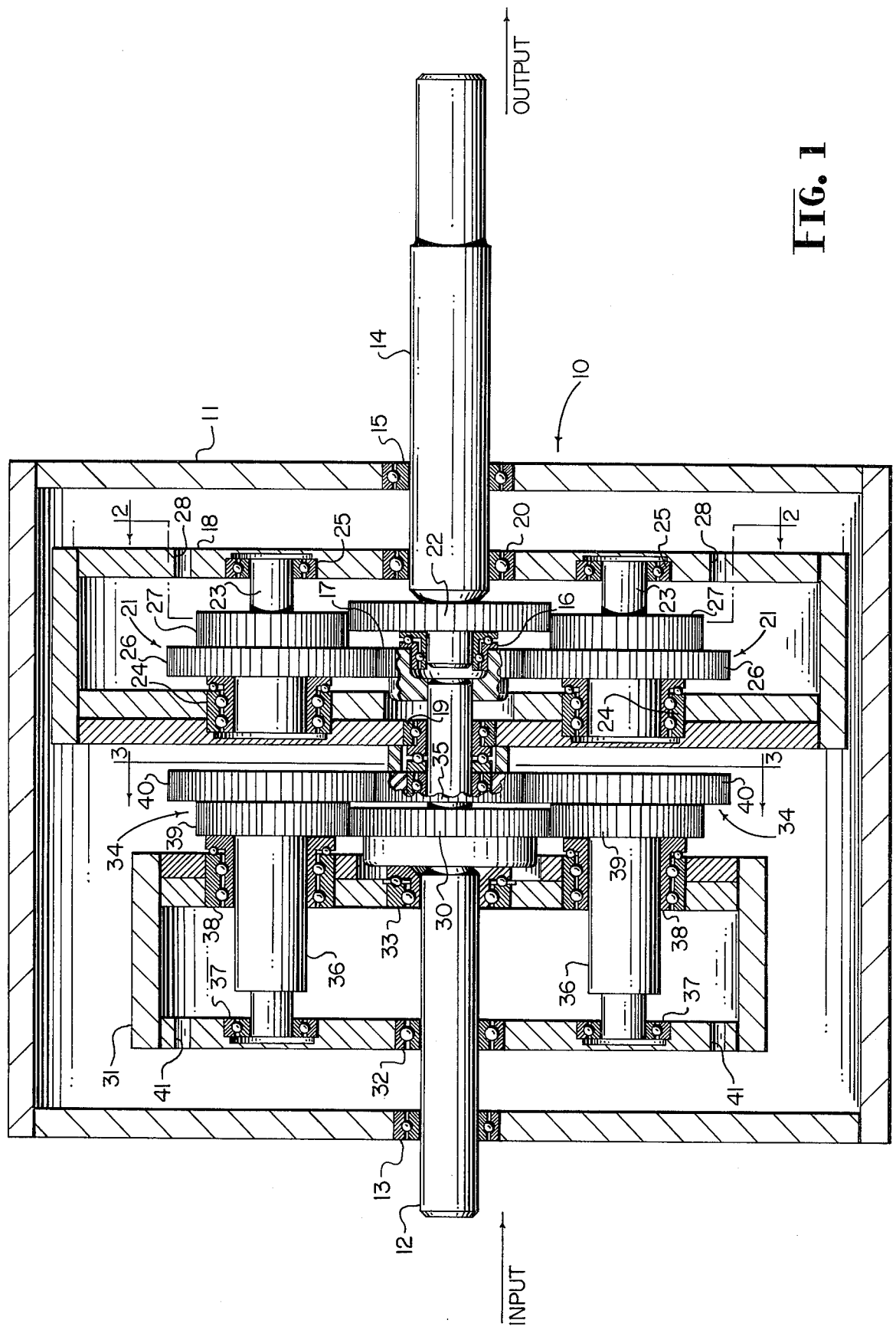
FIG. 1 is a longitudinal sectional elevational view of a transmission constructed in accordance with the invention.

Attention is first directed to FIGS. 1 through 4, where the transmission of the invention is designated generally as 10. It is provided with a housing 11 into which input shaft 12 is journaled on bearing 13 and out of which output shaft 14 is journaled on bearing 15. In order to increase the rigidity of the system, shafts 12 and 14 are interconnected at their ends through bearing 16.

MAIN OR POWER GEAR TRAIN

Figure 4:
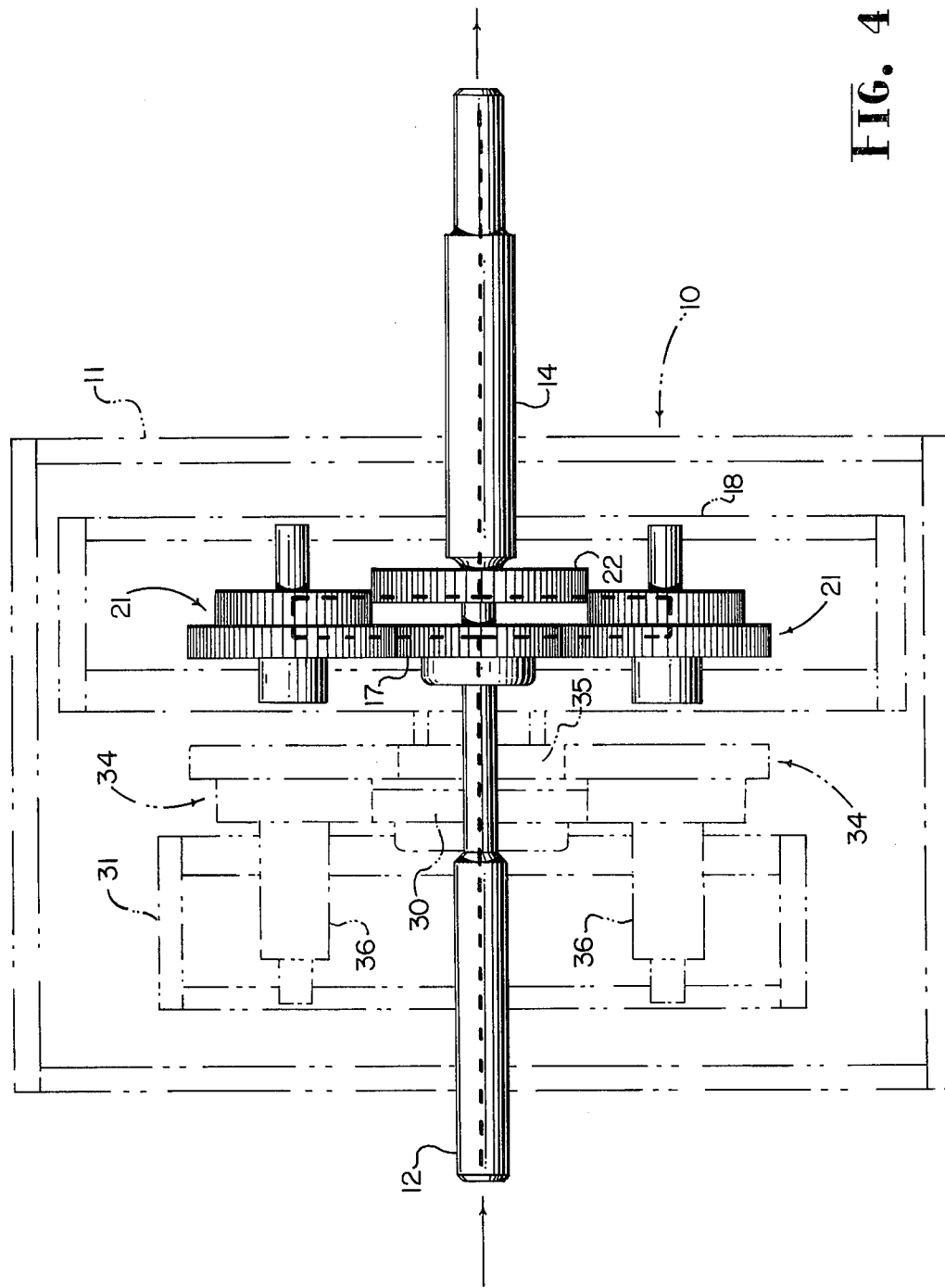
FIG. 4 is a longitudinal sectional elevational view of the transmission of FIG. 1 with the main or power gear train shown in full lines and the control gear train shown in ghosted lines.

The main or power gear train includes the following components: input shaft 12; input sun gear 17, which is fixed to shaft 12 for rotation therewith; power cage 18, which is journaled for rotation on shafts 12 and 14 by bearings 19, 20; planetary gear sets designated generally as 21 carried on power cage 18; output sun gear 22, which is fixed to output shaft 14 for rotation therewith; and output shaft 14. In FIG. 4, the primary main or power gear train components just listed, except for power cage 18, are shown in full lines so that the route of power delivery (indicated by a heavy dashed line) may be traced through the transmission more readily.

The planetary gear sets 21 are mounted on shafts 23 which are journaled for rotation in cage 18 on bearings 24, 25. Each gear set 21 consists of a first gear 26 and a second gear 27 which are keyed to shaft 23 and thus rotate together. First gear 26 meshes with, and is driven by, input shaft sun gear 17. Second gear 27 meshes with, and drives, output shaft sun gear 22.

Figure 2:
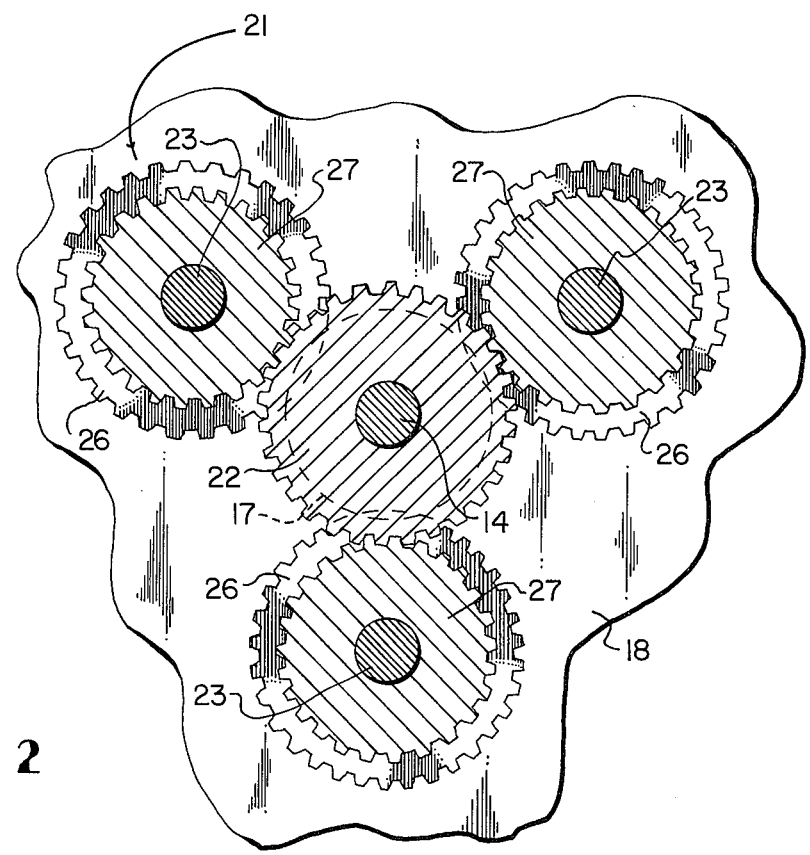
FIG. 2 is a fragmentary transverse sectional view of the planetary power gear train of the transmission of FIG. 1, the section being taken on the line 2—2 of FIG. 1.
Figure 3:
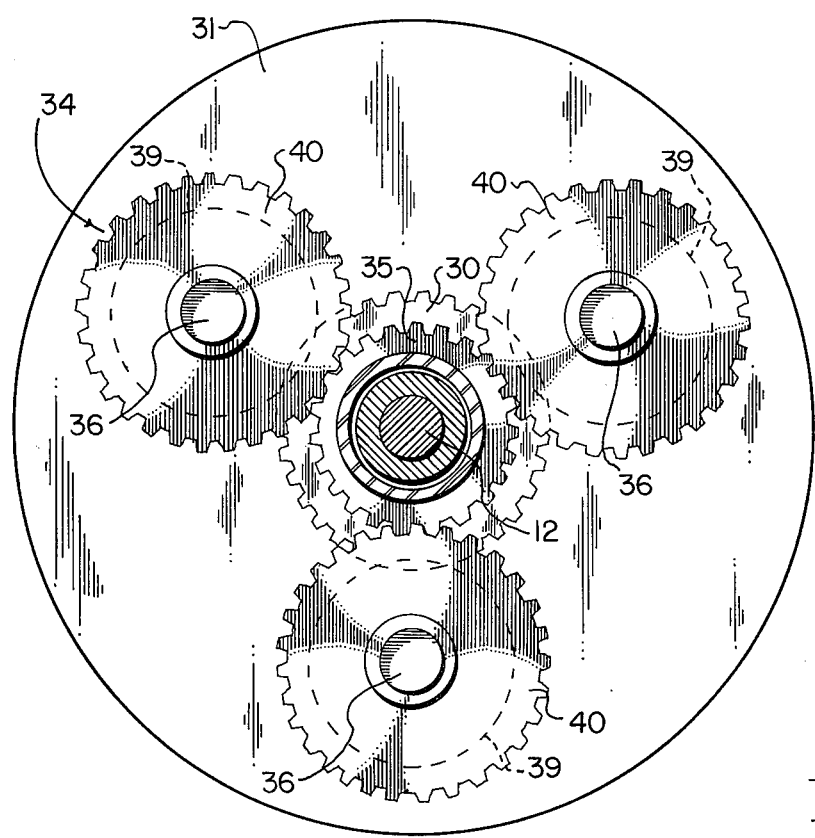
FIG. 3 is a fragmentary transverse sectional view of the planetary control gear train of the transmission of FIG. 1, the section being taken on the line 3—3 of FIG. 1.

It should be noted that for clarity of illustration, FIGS. 1 and 4 show a pair of planetary gear sets 21 opposed to each other by 180°, while FIG. 2 shows three planetary gear sets positioned 120° apart. In point of fact, the number of gear sets is not critical to the invention; a larger number of gear sets results in the distribution of the transmission forces over more planetary gear teeth, tending to reduce wear, and to increase potential power transmission.

Power cage 18 is desirably formed as a closed cylindrical housing with lubricating opening 28 therein, and the planetary gear sets 21 are mounted internally thereof. By being journaled to both the input shaft and the output shaft, cage 18 contributes to the rigidity of the system. Other configurations for cage 18 may be employed, if desired, such as a simple plate journaled to one or the other of the shafts.

As can be seen from a consideration of the relative gear diameters, the overall speed ratio of the main or power gear train decreases from input to output in accordance with the invention.

CONTROL GEAR TRAIN

The control gear train includes the following components: input shaft 12; input sun gear 30, which is fixed to shaft 12 for rotation therewith; control cage 31, which is journaled for rotation on shaft 12 on bearings 32, 33; planetary gear sets designated generally as 34 carried on control cage 31; and output sun gear 35, which is fixed to and rotates with power cage 18.

The planetary gear sets 34 are mounted on shafts 36 which are journaled for rotation on cage 31 on bearings 37, 38. Each gear set 34 consists of a first gear 39 and a second gear 40 which are keyed to shaft 36 and thus rotate together. First gear 39 meshes with, and is driven by, input sun gear 30. Second gear 40 meshes with, and drives, sun gear 35 mounted on power cage 18.

Cage 31 is desirably formed as a closed cylindrical housing with shafts 36 journaled in each face of the housing to increase the rigidity of their support. Planetary gear sets 34 are carried on the face of the cage. Lubricating openings admit oil to the interior of cage 31. As was the case with the power cage, planetary gear sets 34 may be employed in varying numbers.

The overall speed ratio of the control gear train increases from input (shaft 12) to output (cage 18) in accordance with the invention.

LOCK-OUT FEATURES

Figure 5:
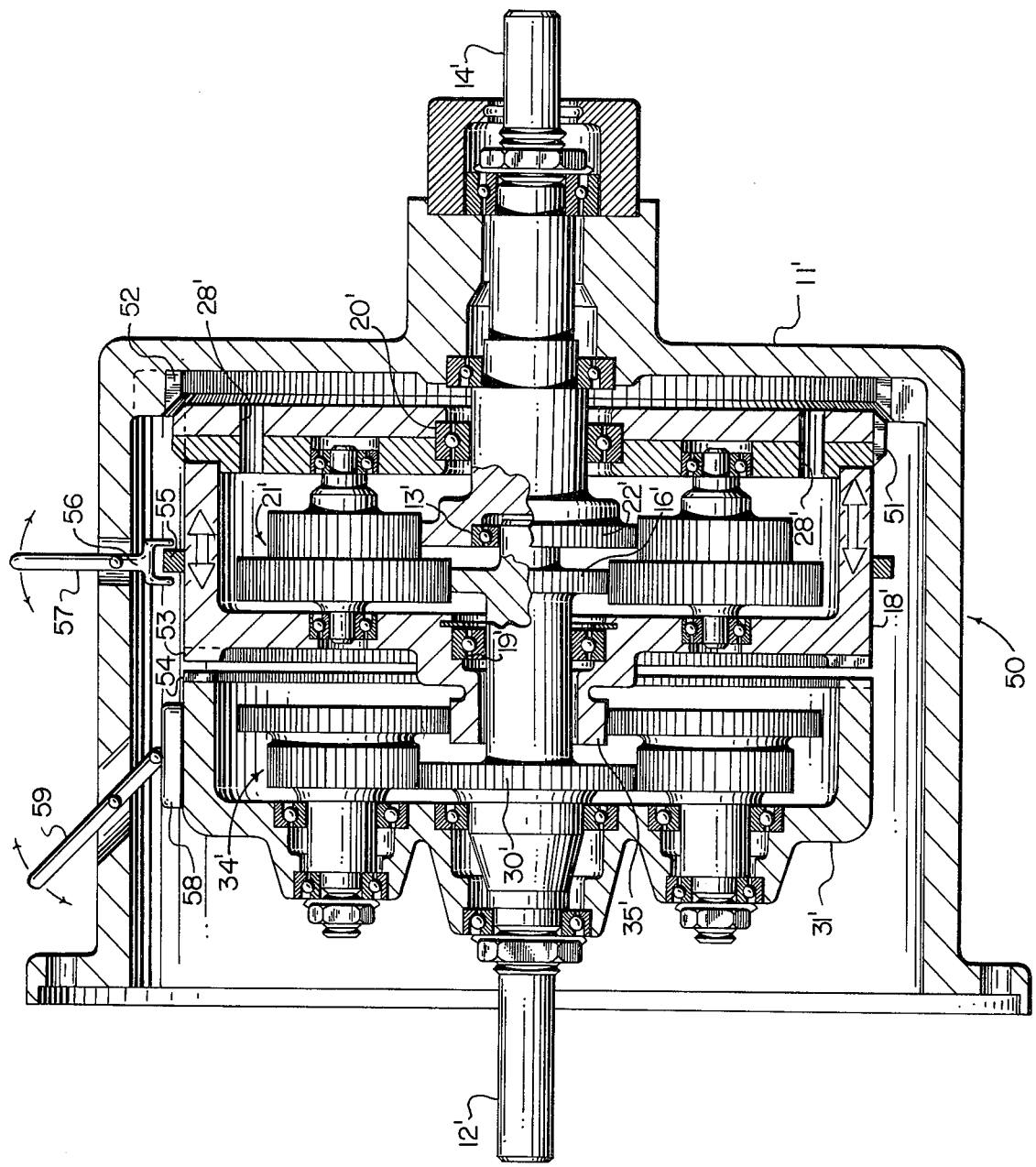
FIG. 5 is a longitudinal sectional elevational view of a transmission constructed in accordance with the invention which is provided with several lock-out mechanisms.

The transmission shown in FIGS. 1-4 and described above embodies the basic automatic torque varying features of the invention. In further accordance with the invention, certain lock-out features may be included in such a transmission to selectively vary its mode of operation. FIG. 5 illustrates a transmission which has been so equipped.

The transmission 50 of FIG. 5 is similar in structure to that of FIGS. 1-4, and includes the basic components of the main or power gear train and the control gear train. These components have been given the same reference characters as the corresponding parts in FIGS. 1-4, (with primes added) even though small variations in structure may occur. Reference is made to the discussion above for an understanding of the structure and arrangement of these parts.

Transmission 50 (FIG. 5) differs from transmission 10 (FIG. 1) in that power cage 18' is adapted to be selectably locked to control cage 31', or to housing 11', or to neither. In addition, means are provided to selectably brake the control cage 31'.

In FIG. 5, cage 18' is slidably mounted on shafts 12' and 14' by bearings 19', 20', as well as being rotatable thereon, as is indicated by the heavy double headed arrows. At one end, cage 18' is provided with a circumferentially arranged ring of teeth 51 sized and positioned to mesh with an internal ring of teeth 52 on housing 11' when cage 18' is displaced to the right as FIG. 5 is drawn. At its other end, cage 18' is provided with another circumferentially arranged ring of teeth 53 sized and positioned to mesh with a ring of teeth 54 on control cage 31' when cage 18' is displaced to the left as FIG. 5 is drawn. In FIG. 5, cage 18 is shown in a position in which it is engaging neither housing teeth 52 nor control cage teeth 51. Cage 18' is also provided with a circumferential rim 55 which is engaged with shifting yoke 56, mounted at the end of pivotally mounted shift lever 57. In this manner, the cage 18' may selectably be locked to cage 31', to housing 11' or held out of engagement with either.

A brake shoe 58 is positioned to brakingly contact the exterior of cage 31', and pivotally mounted braking lever 59 provides for selective application of a braking force to cage 31' to slow or stop its rotation. Those skilled in the art will understand that various other known state of the art means and mechanisms may be employed in accordance with the invention for selectively or automatically locking cages 18' and 31' as discussed here. See generally the patents listed above.

OPERATION

Figure 6:
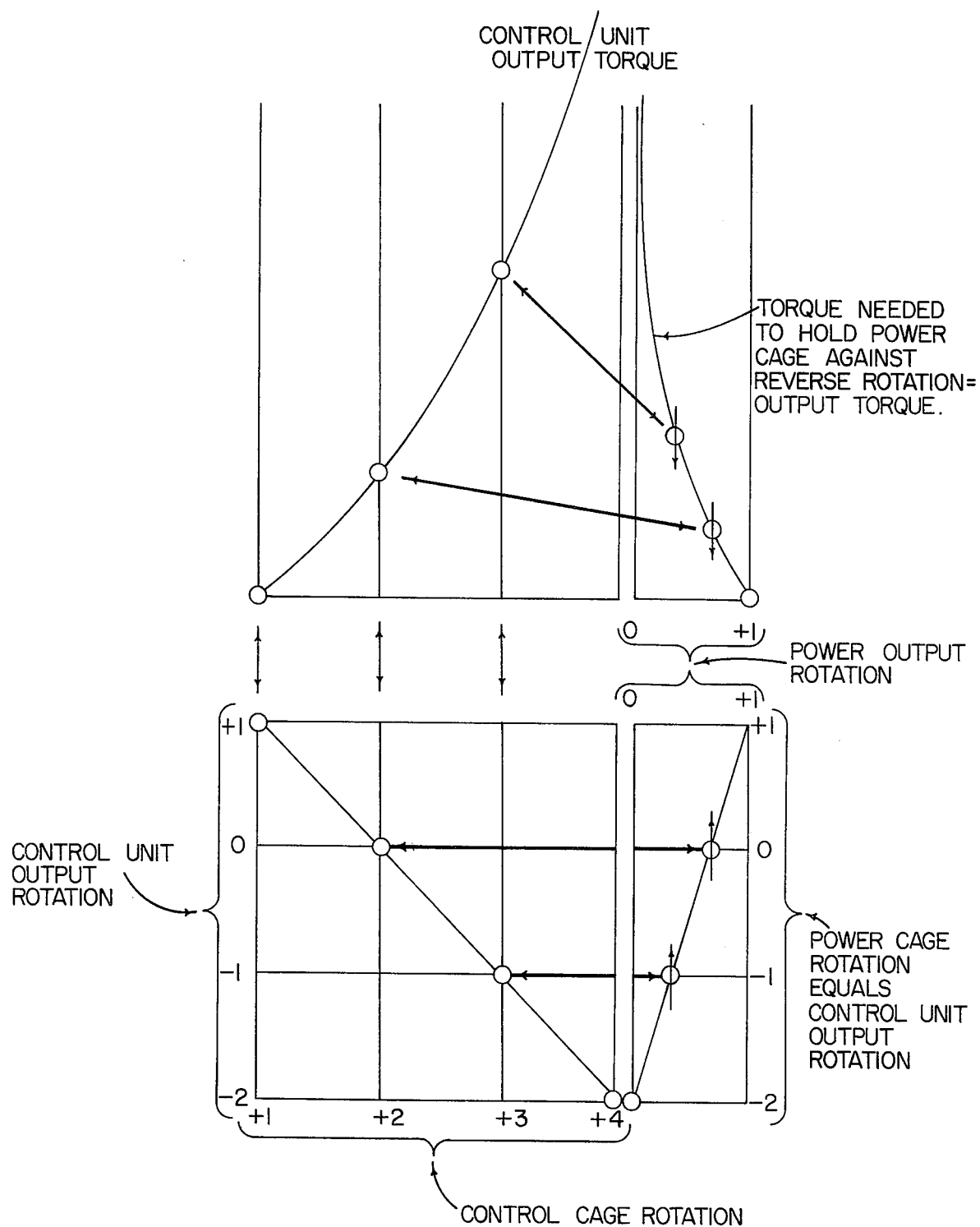
FIG. 6 is a graphic presentation illustrating torque relations within the transmission of the invention.

Attention is directed to FIGS. 4 and 6 from which the automatic torque conversion features of the invention, and particularly the dynamic interplay between the power cage and the control cage upon varying torque loads can best be understood. Considering FIG. 4 first, it can be seen that the primary route of power transmission is from input shaft 12, through sun gear 17, planet gear sets 21, and sun gear 22 to output shaft 14.

As has been pointed out above, in a gear train such as this, with a decreasing overall gear ratio from input to output, torque output varies with the rotational speed of the power cage 18. In particular, torque output is highest at zero output shaft rotation and falls off with both decreasing reverse and increasing forward cage rotation.

As was also pointed out above, in the absence of external forces acting to influence cage rotation, application of a torque load results in reactive forces which tend to rotate cage 18 backward, i.e., into a low torque transmission mode.

In accordance with the invention, external rotational forces are supplied to the cage 18 through the control gear train shown in phantom outline in FIG. 4. These forces are applied as torque to control cage 18 in a direction and in amounts adequate to resist and slow reverse rotation of cage 18 and ultimately to hold it against reverse rotation or to rotate it in a forward direction.

FIG. 6 is a set of four somewhat diagrammatic graphs drawn with their scales aligned, which collectively illustrate the foregoing statements concerning the mode of opertion of the device. The upper set of graphs are torque-speed curves, with their vertical scale left general, since the numerical values will depend on the dimensions (particularly gear ratios) of a particular transmission, and it is not such numerical values but rather the general shapes and relative magnitudes of the curves which are of interest here. The lower set of graphs are plots of relative input rotation and output rotational speeds with the scales arranged in units of input shaft rotation, i.e. as relative rotation.

From the right hand pair of graphs in FIG. 6 it can be seen that power output rotation varies from zero to a rotation equal to the input shaft rotation, and that the torque output is high at low relative rotations, falling off at higher relative rotations. The output torque is also the torque required to hold the power cage against free reverse rotation.

The lower pair of graphs of FIG. 6 shows that power cage relative rotation equals control gear train output rotation, as can be seen by a consideration of the vertical scales. This relationship is a consequence of the fact that the output sun gear of the control train is connected to the power cage. The lower pair of graphs also shows that the power cage rotation varies from forward to reverse rotation, as does control unit output rotation. Torque loading of the control train by the power train slows its rotation to zero and then increases its relative speed in a reverse direction.

The left pair graphs of FIG. 6 shows that control cage rotation is forward at all speeds, with output torque increasing with speed. Torque loading of the control train by the power unit increases the forward rotational speed of the control cage, which is desirable because it results in increased control unit ouput torque.

The sets of double-headed arrows on FIG. 6 indicate that when corresponding relative speeds and torques are compared for the transmission of the invention, the torque output of the control unit is always equal to or greater than the torque required to hold the power cage against free reverse rotation, which is the desired result.

The transmission of FIG. 5 operates in the manner just outlined when cage 18' is lockingly engaged with neither the housing 11' nor control cage 31'. When it is locked to the housing by actuation of lever 57, it then acts as a straight forward speed change gearbox, with the control cage rotating at a speed yielding zero output rotation. When cages 18' and 31' are locked together by opposite actuation of lever 57, the transmission becomes a straight-through transmission device. When cage 31' is braked by actuation of lever 59, (and disengaged from cage 18') an overdrive effect is obtained.

I claim:

1. An automatically variable transmission comprising:
   (a) a power input shaft connectible to a power source which may be liable to vary with time in speed and torque;
   (b) a power output shaft aligned with said power input shaft and connectable to a load which may be liable to vary with time in speed and torque demand;
   (c) said input shaft and output shaft being interconnected by a power gear train comprising:
      (i) a power drive gear locked to and rotatable with said input shaft;
      (ii) a gear-carrying power cage mounted for rotation about the axis of said input shaft;
      (iii) at least one pair of planetary power gears coaxially mounted on and rotatable on said power cage, the first gear of said pair being meshed with said power drive gear; and
      (iv) a driven power gear locked to and rotatable with said output shaft, and meshed with the second planetary power gear of said pair;
   the overall speed ratio (gear ratio) of said power gear train decreasing from input to output; and
   (d) a control gear train for controlling the rotation of said power cage comprising:
      (i) a control drive gear locked to and rotatable with said input shaft;
      (ii) a gear-carrying control cage mounted for rotation about the axis of said input shaft;
      (iii) at least one pair of planetary control gears coaxially mounted on and rotatable on said control cage, the first gear of said pair being meshed with said control drive gear; and
      (iv) a driven control gear locked to and rotatable with said power cage, and meshed with the second planetary control gear of said pair;
   the overall speed ratio (gear ratio) of said control gear train increasing from input to output.

2. A transmission in accordance with claim 1 and further comprising means for selectively locking said power cage against rotation.

3. A transmission in accordance with claim 2 and further comprising a housing surrounding said gear trains, and in which said locking means comprises means for selectively sliding said power cage axially of the transmission, and locking teeth on said cage and said housing engagable and disengagable with each other upon reciprocal sliding of said power cage.

4. A transmission in accordance with claim 1 and further comprising means for selectively locking said power cage to said control cage for rotation therewith.

5. A transmission in accordance with claim 4 in which said locking means comprises means for selectively sliding said power cage axially of the transmission, and locking teeth on said power cage and said control cage engagable and disengable with each other upon reciprocal sliding of said power cage.

6. A transmission in accordance with claim 1 and further comprising means for selectively restraining said control cage against rotation.

7. A transmission in accordance with claim 6 in which said restraining means comprise a shoe brakingly engagable with a surface of said control cage.

8. A transmission in accordance with claim 1 in which said power cage comprises a hollow substantially cylindrical housing having said power cage planetary gears mounted interiorly thereof, said cylindrical housing being journaled for rotation on both said input shaft and said output shaft.

9. A transmission in accordance with claim 1 and further comprising means for selectively locking said power cage against rotation, and means for selectively locking said power cage to said control cage for rotation therewith.

10. A transmission in accordance with claim 9 and further comprising means for selectively restraining said control cage against rotation.

* * * * *